United States Patent
Okumura

(10) Patent No.: US 6,720,762 B2
(45) Date of Patent: Apr. 13, 2004

(54) ROTATION-ANGLE DETECTING DEVICE CAPABLE OF DETECTING ABSOLUTE ANGLE WITH SIMPLE CONFIGURATION

(75) Inventor: Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/377,919

(22) Filed: Feb. 27, 2003

(65) Prior Publication Data

US 2003/0169034 A1 Sep. 11, 2003

(30) Foreign Application Priority Data

Mar. 5, 2002 (JP) .................................. 2002-058810
Aug. 19, 2002 (JP) .................................. 2002-238497

(51) Int. Cl.⁷ ............................................. G01B 7/30
(52) U.S. Cl. ............................ 324/207.21; 324/207.25
(58) Field of Search ...................... 324/207.12, 207.2, 324/207.21, 207.25, 207.26, 173–174; 338/32 R, 32 H; 702/151

(56) References Cited

U.S. PATENT DOCUMENTS 5,481,188 A * 1/1996 Mizutani ............... 324/207.25
6,246,232 B1 * 6/2001 Okumura ................. 324/207.2
6,324,905 B2   12/2001 Noltemeyer et al. ....... 73/865.9
6,507,188 B1 * 1/2003 Dilger et al. .......... 324/207.25
6,552,533 B2 * 4/2003 Schodlbauer et al. .... 324/207.2

* cited by examiner

*Primary Examiner*—Jay Patidar
(74) *Attorney, Agent, or Firm*—Beyer Weaver & Thomas, LLP

(57) ABSTRACT

A rotation-angle detecting device includes a rotor, a first output mechanism for outputting a first detection signal in response to the rotation of the rotor, and a second output mechanism for outputting a second detection signal in response to the rotation of the rotor. The first output mechanism includes a first output gear meshed with a first transmission gear of the rotor and having an axis in parallel with the axis of the rotor, and a first output section for outputting the first detection signal in response to the rotation of the first output gear. The second output mechanism includes a second output gear meshed with a second transmission gear of the rotor and having an axis in parallel with the axis of the rotor, and a second output section for outputting the second detection signal in response to the rotation of the second output gear.

6 Claims, 7 Drawing Sheets

ROTATION-ANGLE DETECTING DEVICE CAPABLE OF DETECTING ABSOLUTE ANGLE WITH SIMPLE CONFIGURATION

BACKGROUND OF THE INVENTION

1. Field of the Invention

The present invention relates to rotation-angle detecting devices, and more particularly, to a low-profile and compact rotation-angle detecting device having a simple configuration.

2. Description of the Related Art

A known type of rotation-angle detecting device will be described with reference to FIGS. 7 and 8. FIG. 7 is a plan view showing the inner configuration of the rotation-angle detecting device, and FIG. 8 is an explanatory view showing the output characteristics of the rotation-angle detecting device with respect to the rotation angle.

Referring to FIG. 7, a rotating member 23 is mounted inside a case body 22 made of insulating resin. The rotating member 23 is made of insulating resin, is shaped like a cylinder, and is rotatably supported by the case 22. A shaft of a steering wheel of an automobile extends through the rotating member 23 so that the rotating member 23 is rotated clockwise and counterclockwise together with the steering wheel. A helical gear 23a having a plurality of teeth is formed on the entire outer peripheral surface of the rotating member 23.

A rotation shaft 29 is rotatably provided inside the case body 22. A driving gear 28 is fixed to the rotation shaft 29. A helical gear 28a having a plurality of teeth is formed on the entire outer peripheral surface of the driving gear 28, and is meshed with the helical gear 23a of the rotating member 23. A first ring-shaped magnet 25A having a pair of magnetic poles on its outer peripheral surface is provided adjacent to the driving gear 28 so that it is coaxial with the rotation shaft 29. The rotation shaft 29 is made of metal such as brass or aluminum, and has a spiral screw groove 29a formed from the center to one end. A moving member 24 is engaged with the screw groove 29a.

The moving member 24 has a through hole extending from one end face to the other end face in the moving direction. The through hole has, on its inner peripheral surface, an internal thread (not shown) to be meshed with the screw grove 29a formed on the rotation shaft 29. A second magnet 25B having a pair of magnetic poles is fixedly attached to the lower surface of the moving member 24. The moving member 24 is guided inside the case body 22 so as to linearly move in the axial direction of the rotation shaft 29. When the rotating member 23 rotates and the driving gear 28 and the rotation shaft 29 also rotate, the moving member 24 and the second magnet 25B reciprocally move in the axial direction of the rotation shaft 29.

A substrate 30 on which first and second Hall elements (detection means) 26A and 26B are mounted is fixed in the lower part of the case body 22. A pair of first Hall elements 26A face the first magnet 25A, and the second Hall element 26B faces the second magnet 25B. When the rotation shaft 29 rotates, the first Hall elements 26A detect the magnetic displacement of the first magnet 25A, and output predetermined sinusoidal waves 101 and 102 shown in FIG. 8 as first detection signals in response to the rotation. When the second magnet 25B is reciprocally moved in the axial direction of the rotation shaft 29 along the screw groove 29a, the second Hall element 26B detects the magnetic displacement of the second magnet 25B, and outputs a signal 103, which linearly changes over the entire rotation angle range of the steering wheel, as a second detection signal. The absolute angle of the rotation angle (steering angle) of the steering wheel can be detected on the basis of the first and second detection signals output from the first and second Hall elements 26A and 26B.

In the above-described known rotation-angle detecting device, however, a driving gear with a helical gear to be meshed with the helical gear on the outer peripheral surface of the rotating member must be provided, and the driving gear and the rotating member are arranged so that their rotation axes are orthogonal to each other. Consequently, the thickness and size of the rotation-axis detecting device are increased by of the diameter of the driving gear.

SUMMARY OF THE INVENTION

Accordingly, it is an object of the present invention to provide a low-profile compact rotation-angle detecting device that can measure the absolute angle with a simple configuration.

In order to achieve the above object, according to an aspect, the present invention provides a rotation-angle detecting device including a rotor, a first output mechanism for outputting a first detection signal in response to the rotation of the rotor, and a second output mechanism for outputting a second detection signal in response to the rotation of the rotor, wherein a first transmission gear and a second transmission gear having intermittent teeth are arranged along the rotation axis on an outer peripheral surface of the rotor, the first output mechanism includes a first output gear that is meshed with the first transmission gear and that rotates on an axis in parallel with the axis of the rotor, and a first output section for outputting the first detection signal in response to the rotation of the first output gear, the second output mechanism includes a second output gear that is meshed with the second transmission gear and that rotates on an axis in parallel with the axis of the rotor, and a second output section for outputting the second detection signal in response to the rotation of the second output gear, and the rotation angle of the rotor is detected as an absolute angle on the basis of the first detection signal and the second detection signal.

The above features make it possible to provide a low-profile compact rotation-angle detecting device that can measure the absolute angle with a simple configuration.

Preferably, the first detection signal has a predetermined period and continues within the rotation range of the rotor, and the second detection signal rises or falls stepwise within the rotation range of the rotor.

This allows the rotation-angle detection device to measure the absolute angle with high precision.

Preferably, the second output gear includes upper and lower tooth segments arranged vertically and alternately, the upper tooth segment is meshed with the second transmission gear, and the lower tooth segment engages with the outer peripheral surface of the rotor after the upper tooth segment is rotated by a predetermined angle in engagement with the second transmission gear, thereby preventing the second output gear from returning.

In this case, the second output gear can be prevented from returning with a simple structure, and the accuracy in detecting the rotation angle can be increased.

Preferably, each of the first output section and the second output section includes a permanent magnet with different magnetic poles opposing each other with the rotation axis therebetween, and a magnetoresistive element whose resistance varies depending on the direction of a magnetic field of the permanent magnet.

In this case, the rotation angle can be detected in a non-contact manner. Moreover, since the magnetoresistive element is used, the detection accuracy can be increased, regardless of assembly accuracy.

Preferably, the first output mechanism is a non-contact magnetic output means, and the second output mechanism is a contact output means.

In this case, since the second output mechanism is less expensive than the first output mechanism, the cost can be reduced. Moreover, since the number of revolutions of the second output mechanism is smaller than that of the first output mechanism, the second output mechanism can stand long use.

Preferably, the second output mechanism is a rotary variable resistor.

Since the second output mechanism can be thereby made even less expensive, the rotation-angle detecting device can be provided at a lower price.

Further objects, features, and advantages of the present invention will become apparent from the following description of the preferred embodiments with reference to the attached drawings.

DESCRIPTION OF THE PREFERRED EMBODIMENTS

Figure 1:
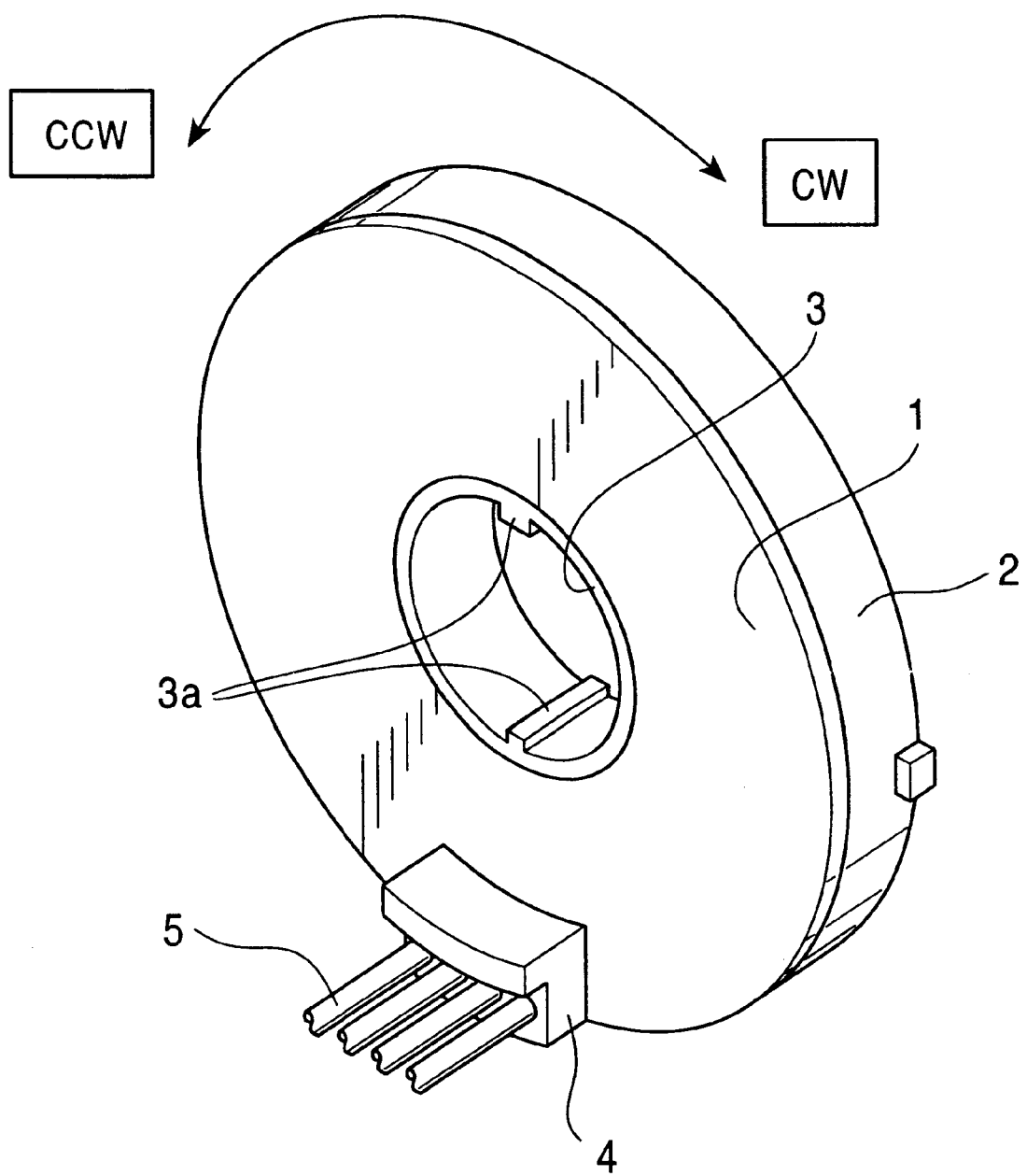
FIG. 1 is a perspective view of a rotation-angle detecting device according to an embodiment of the present invention.
Figure 2:
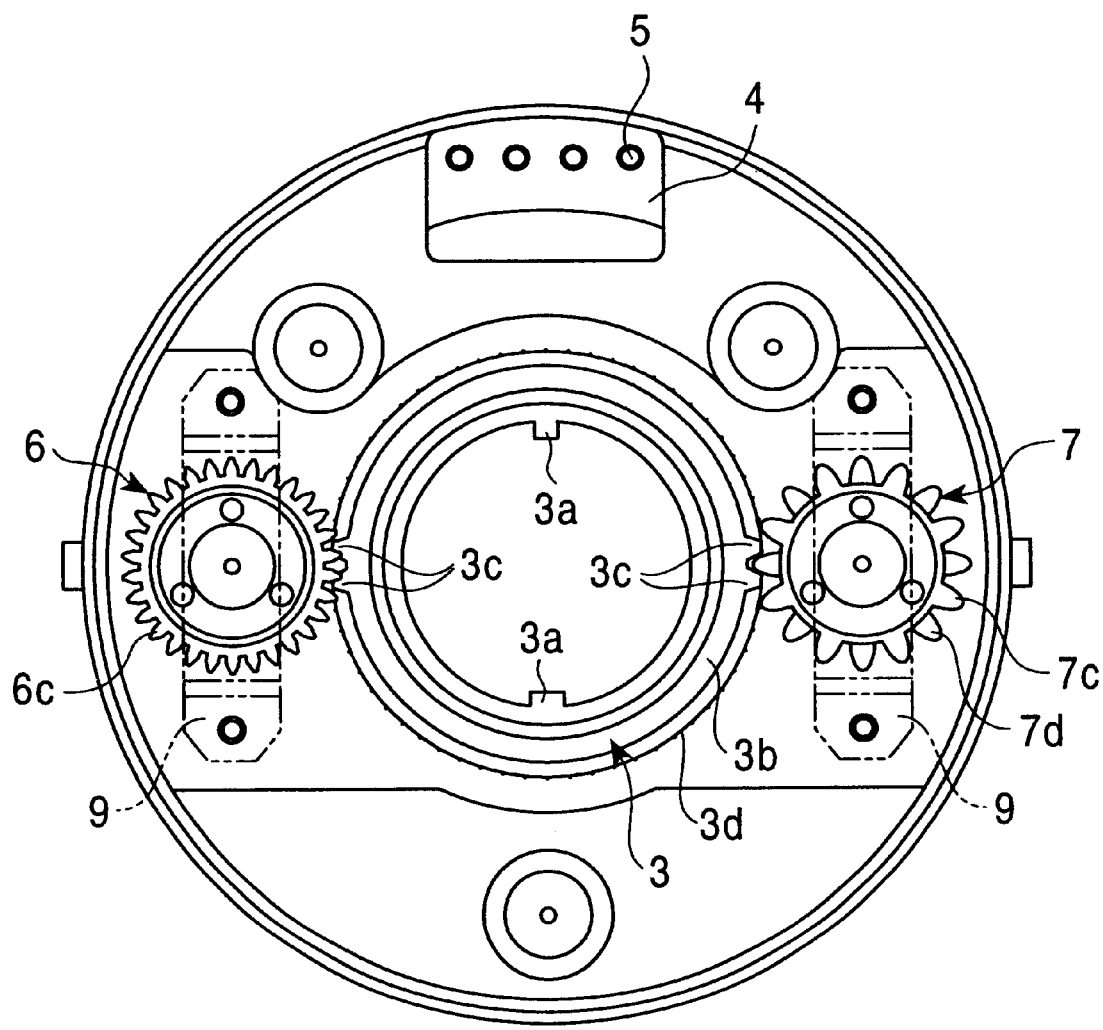
FIG. 2 is a plan view of the rotation-angle detecting device.
Figure 3:
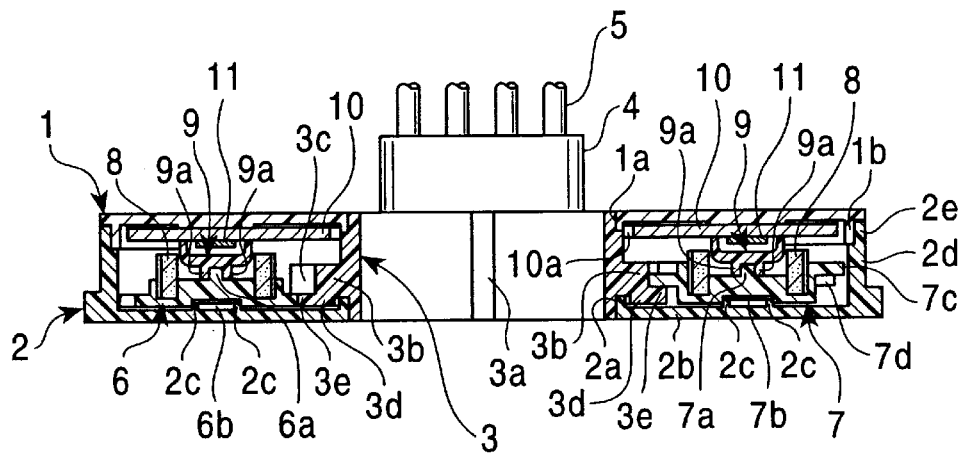
FIG. 3 is a cross-sectional view of the rotation-angle detecting device.
Figure 4:
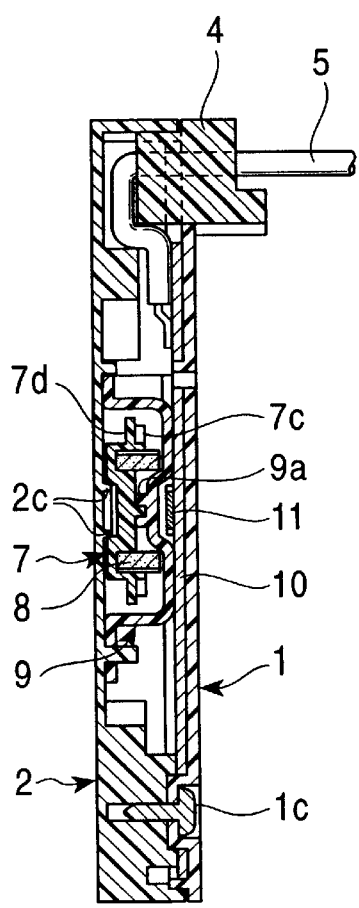
FIG. 4 is a cross-sectional view showing the principal parts of the rotation-angle detecting device.

A rotation-angle detecting device according to an embodiment of the present invention will be described below with reference to FIGS. 1 to 6.

The rotation-angle detecting device of this embodiment has an upper case 1 made of insulating resin and shaped like a disk having a center hole 1a. The upper case 1 has a stepped portion 1b on its outer periphery. A lead-wire extending portion 4 is formed at an end of the upper side of the upper case 1, and lead wires 5 extend outside therefrom.

A lower case 2 includes a bottom plate 2b shaped like a disk having a center hole 2a, and a side wall 2d. The bottom plate 2b has a ring-shaped projecting portion 2c. A stepped portion 2e is formed at the upper end of the side wall 2d, and is engaged with the stepped portion 1b of the upper case 1. The upper case 1 and the lower case 2 are fastened together by a screw 1c.

A rotor 3 is made of insulating resin and shaped like a cylinder. Ribs 3a to be engaged with an external rotating shaft are formed on the inner periphery of the rotor 3. A second transmission gear 3b is formed on the upper outer periphery of the rotor 3, and two intermittent teeth 3c are formed on the opposing sides of the second transmission gear 3b so that they are spaced 180° apart from each other. Teeth are provided on the entirety of the lower outer periphery of the rotor 3, thereby forming a first transmission gear 3d. The rotor 3 is held between the upper case 1 and the lower case 2 so that it can rotate clockwise and counterclockwise relative to the upper case 1 and the lower case 2.

A first output gear 6 is a general type of gear that is made of insulating resin, that has an axis in parallel with the axis of the rotor 3, and that is provided with teeth 6c on its entire periphery. A projection 6a is formed at the center of one side face of the first output gear 6, and a circular recess 6b is formed at the center of the other side face. The teeth 6c of the first output gear 6 are engaged with the teeth 3e of the first transmission gear 3d formed on the lower periphery of the rotor 3. The first output gear 6 rotates 360° while the rotor 3 rotates 180°.

A second output gear 7 is a double gear that is made of insulating resin, that has an axis in parallel with the axis of the rotor 3, and that includes two upper and lower tooth segments placed in the axial direction so that upper teeth 7c and lower teeth 7d are alternately arranged. The teeth 7c and 7d are formed on the entire periphery. A projection 7a is formed at the center of one side face of the second output gear 7, and a circular recess 7b is formed at the center of the other side face. The upper teeth 7c and the lower teeth 7d of the second output gear 7 are to be engaged with the intermittent teeth 3c of the second transmission gear 3b formed on the upper side of the outer periphery of the rotor 3.

Two ring-shaped permanent magnets 8 each have different magnetic poles that oppose each other with the rotating shaft therebetween at the positions spaced 180° apart from each other. The permanent magnets 8 are fixedly mounted inside the teeth of the first output gear 6 and the second output gear 7, respectively.

Two support members 9 are formed of a plate made of insulating resin. Both ends in the longitudinal direction thereof are inclined downward, and are fixed to the lower case 2. Ring-shaped projections 9a are respectively formed on the lower sides of the support members 9. The projection 6a formed on one side face of the first output gear 6 is fitted in the ring-shaped projection 9a of one of the support members 9, and the circular recess 6a on the other side face is fitted on the ring-shaped projection 2c of the bottom plate 2b of the lower case 2, so that the first output gear 6 is rotatably supported while being retained from both the sides. The projection 7a formed on one side face of the second output gear 7 is fitted in the ringshaped projection 9a of the other support member 9, and the circular recess 7a on the other side face is fitted on the ring-shaped projection 2c of the bottom plate 2b of the lower case 2, so that the second transmission gear 7 is also rotatably supported while being retained from both the sides.

A printed wiring board 10 is shaped like a disk having a circular hole 10a at its center, and is fixed to the lower side of the upper case 1. The output from the printed wiring board 10 is led outside by the lead wires 5 through the lead-wire extending portion 4.

Figure 6:
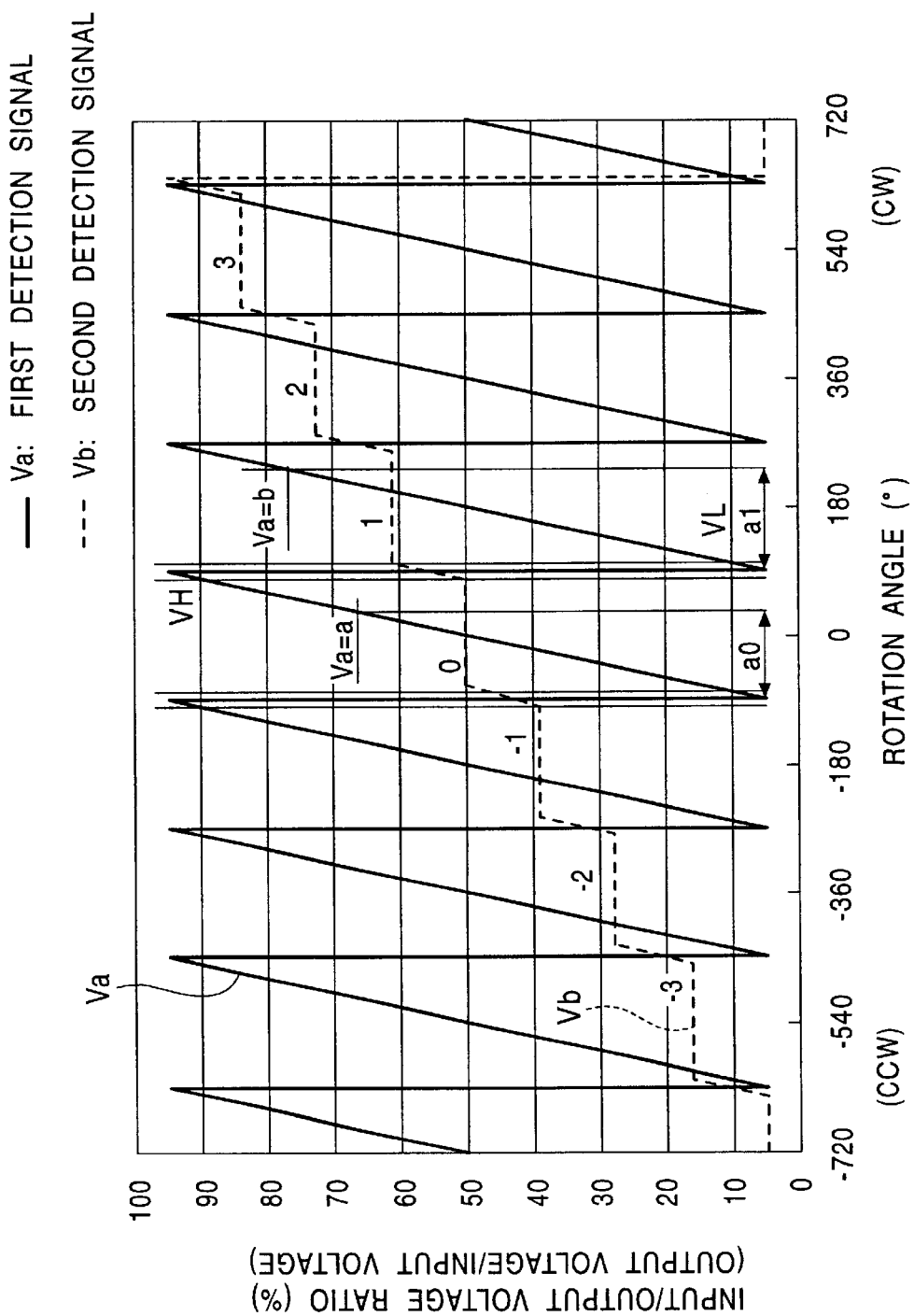
FIG. 6 is an explanatory view showing the relationship between first and second detection signals and the rotation angle in the rotation-angle detecting device.
Figure 7:
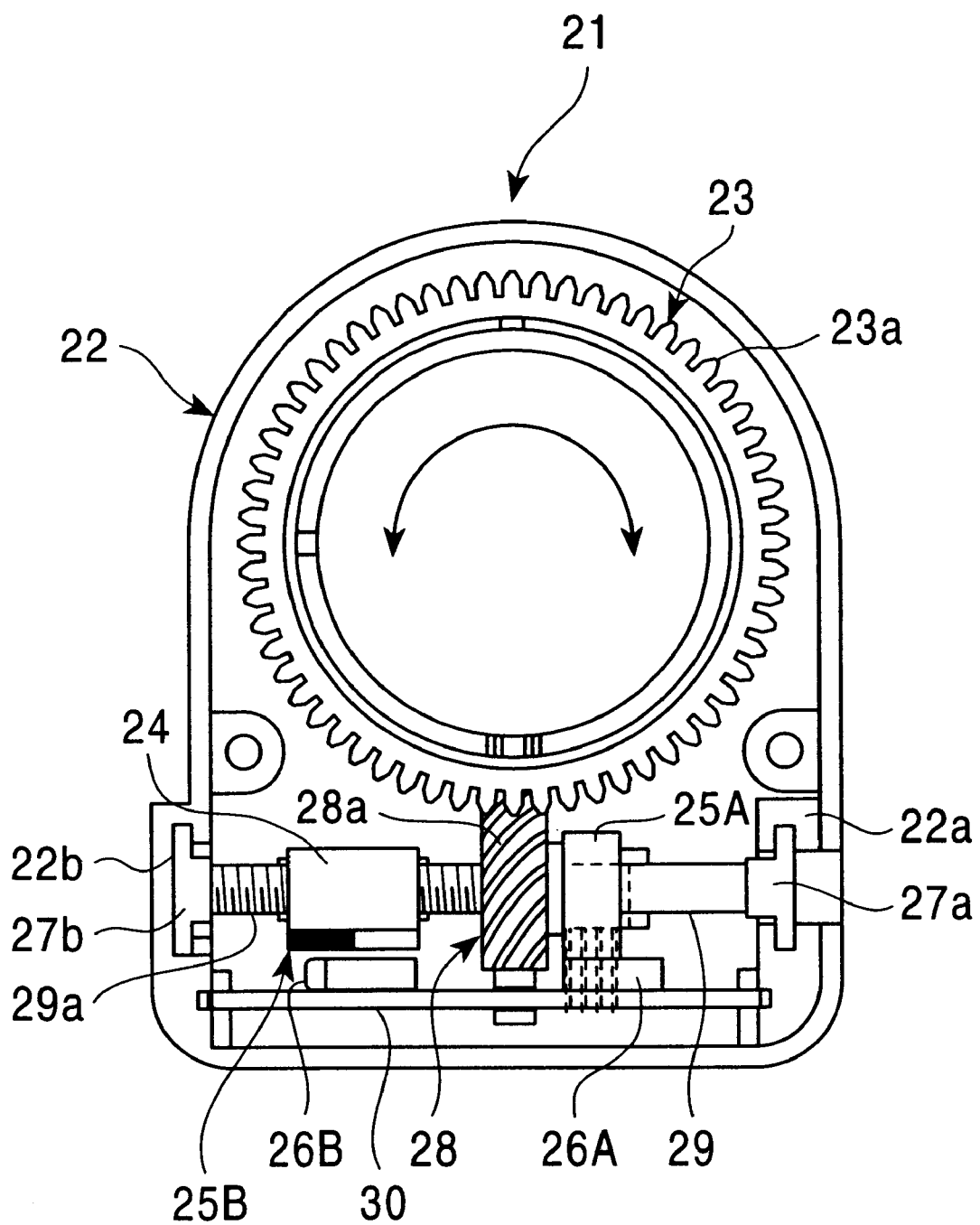
FIG. 7 is a plan view showing the inner configuration of a known rotation-angle detecting device.
Figure 8:
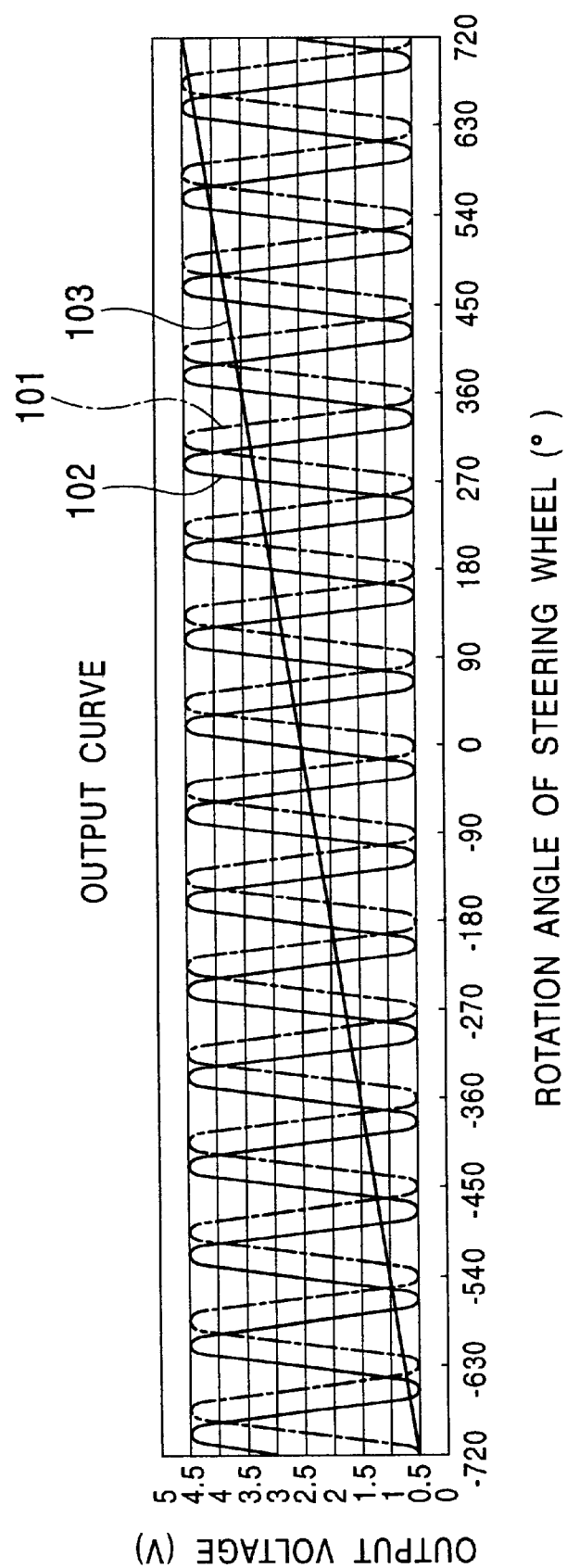
FIG. 8 is an explanatory view showing the output characteristics with respect to the rotation angle of the known rotation-angle detecting device.

Magnetoelectric transducers 11 are each formed of an assembly of a plurality of giant magnetoresistive (GMR) elements, and the GMR elements form a bridge circuit (not shown). The magnetoelectric transducers 11 are mounted on the printed wiring board 10 so that they oppose the ring-shaped permanent magnets 8 that corotate with the first output gear 6 and the second output gear 7. The resistance of the magnetoelectric transducers 11 varies depending on the direction of the magnetic field of the permanent magnets 8. The permanent magnet 8 that corotates with the first output gear 6, and the magnetoelectric transducer 11 opposed thereto constitute a first detecting section, and the permanent magnet 8 that corotates with the second output gear 7, and the magnetoelectric transducer 11 opposed thereto constitute a second detecting section. As shown in FIG. 6, a sawtooth periodic first detection signal Va is obtained from the first detecting section, and a second detection signal Vb that rises stepwise is obtained from the second detecting section. The first output gear 6 and the first detecting section constitute a first output mechanism, and the second output gear 7 and the second detecting section constitute a second output mechanism. The first and second detection signals Va and Vb are output from the first and second output mechanisms.

The engagement between the second output gear 7 formed of a double gear and the intermittent teeth 3c formed on the outer periphery of the rotor 3 will now be described with reference to FIG. 5.

Figure 5A:
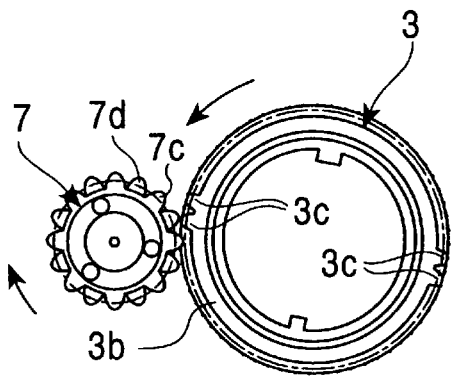
FIGS. 5A to 5E are explanatory views showing the engagement of intermittent teeth and a double gear in the rotation-angle detecting device.
Figure 5D:
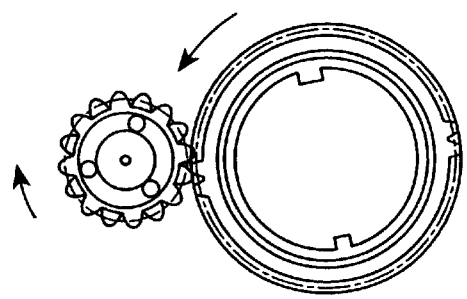
Figure 5B:
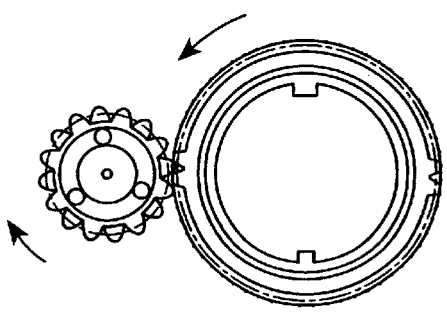
Figure 5E:
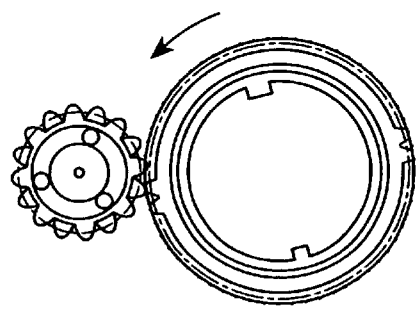
Figure 5C:
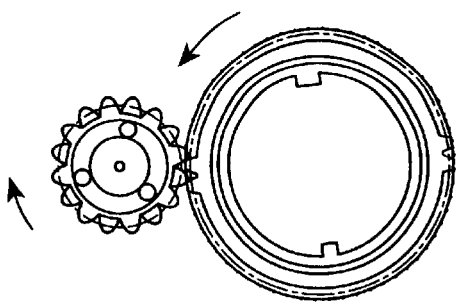

In FIG. 5A, when the rotor 3 rotates counterclockwise (in the direction shown by the arrow in the figure), the outside of the preceding tooth of the intermittent teeth 3c hits an upper tooth 7c of the second output gear 7, and the second output gear 7 slightly rotates clockwise (in the direction shown by the arrow in the figure). In FIG. 5B, a lower teeth 7d of the second output gear 7 enters a space between the intermittent teeth 3b, and is pressed by the wall of the following tooth, so that the second output gear 7 starts to further rotate clockwise. In FIGS. 5C and 5D, since the lower tooth 7d of the second output gear 7 is continuously pressed, the second output gear 7 further rotates clockwise. With this rotation, the lower tooth 7d is coming out of the space between the intermittent teeth 3c. In FIG. 5E, the lower tooth 7d is completely out of the space. In this case, the lower tooth 7d and the leading end of a lower tooth 7d on the upstream side in the rotating direction contact the peripheral surface of the rotor 3 connected to the space between the teeth 3c, thereby preventing the second output gear 7 from further rotating. In this way, the second output gear 7 rotates by a predetermined angle (an angle corresponding to one pitch of the upper teeth 7c or the lower teeth 7d).

Subsequently, the second output gear 7 does not rotate until the rotor 3 has rotated approximately 180°. When the rotor 3 has rotated approximately 180°, the other intermittent teeth 3c spaced 180° apart in the rotor 3 are brought into contact with an upper tooth 7c of the second output gear 7, and the same rotation as above is performed. Therefore, the second output gear 7 rotates by a predetermined angle (an angle corresponding to one pitch of the upper teeth 7c or the lower teeth 7d) every time the rotor 3 rotates 180°.

A description will now be given of detection signals and a method for measuring the rotation angle on the basis of the detection signals in the rotation-angle detecting device. In FIG. 6, detection signals are shown in the form of the ratio of the output voltage to the input voltage to the magnetoelectric transducer 11, and the rotation angles in the clockwise and counterclockwise directions are also shown. Referring to FIG. 6, a first detection signal Va includes sawtooth pulses having a period of 180°, and each of the pulses includes a portion that gradually and linearly rises, and a portion that falls sharply. The portion that gradually and linearly rises is obtained by calculating, with an arithmetic element (not shown) mounted on the printed wiring board 10, a sine-wave output and a cosinewave output from the bridge circuit in the magnetoelectric transducer 11 in conjunction with the ring-shaped permanent magnet 8 that corotates with the first output gear 6, and converting the calculated value into an output value that is linear with respect to the rotation angle of the rotor 3. The portion that sharply falls is a portion in which one period of the first detection signal Va ends and the first detection signal Va returns to its initial value.

A second detection signal Vb has a waveform that rises stepwise at every 180°. The intermittent teeth 3c are spaced 180° apart from each other in the rotating direction on the periphery of the rotor 3, and the second output gear 7 formed of a double gear to be meshed with the intermittent teeth 3c of the rotor 3 is rotated by a predetermined angle by the intermittent teeth 3c every time the rotor 3 rotates 180°. When the second output gear 7 is rotated by the predetermined angle, the output from the bridge circuit in the magnetoelectric transducer 11 is changed by the permanent magnet 8 that corotates with the second output gear 7, and an increase corresponding to a stepwise rise of the second detection signal Vb is found by calculation. The signal rises stepwise at every 180°, that is, every time the intermittent teeth 3c of the rotor 3 and the second output gear 7 are engaged with each other.

The center of the gradually rising portion of the second detection signal Vb corresponds to the sharply rising portion of the first detection signal Va. The flat portion of the second detection signal Vb links gradually rising portions. The position number of the flat portion is shown by the numeral in FIG. 6. The center of the 0-th flat portion corresponds to a rotation angle of 0°.

A method for calculating an absolute angle A will be described below with reference to FIG. 6. In the following description, N is an integer, B is an angle calculated from a portion of the first detection signal Va that gradually and linearly rises, VH is an upper threshold of the first detection signal Va corresponding to the lower end of a gradually rising portion of the second detection signal Vb, VL is a lower threshold of the first detection signal Va corresponding to the upper end of a gradually rising portion of the second detection signal Vb, $\Theta a$ is a rotation angle range set corresponding to each flat portion (a rotation angle range corresponding to one period of the first detection signal: 180° in this embodiment), and $\Theta 0$ is an arbitrary rotation angle (90° in this embodiment).

When the value of the second detection signal Vb is included in the 0-th flat portion (N=0), first, a rotation angle range a0 is found on the basis of the value of the first detection signal Va (Va=a). Next, a rotation angle range $\Theta a$ corresponding to the flat portion and an arbitrary rotation angle $\Theta 0$ (the amount of offset of the first detection signal from the reference position) are set. Since $\Theta a$ is 180° and $\Theta 0$ is 90° in FIG. 6, an absolute angle A (°) is given by an expression 180×0−90+a0=a0−90.

When the value of the second detection signal Vb is included in the first (N=1) flat portion, first, the rotation angle range a1 is found on the basis of the first detection signal Va (Va=b), and the rotation angle range $\Theta a$ corresponding to the flat portion and an arbitrary rotation angle Θ0 are then set, in a manner similar to the above. The absolute angle A (°) is given by an expression 180×1−90+a1=90+a1.

A description will now be given of a case in which the value of the second detection signal Vb is included in a gradually rising portion between the 0-th (N=0) flat portion and the first (N=1) flat portion. A value of the first detection signal Va set corresponding to the lower end of the gradually rising potion is designated VH, and a value of the first detection signal Va set corresponding to the upper end of the gradually rising portion is designated VL. When the value of the first detection signal Va is higher than VH, a rotation angle range B is first found on the basis of the first detection signal Va. A rotation angle range Θa corresponding to the flat portion and an arbitrary rotation angle Θ0 are set in a manner similar to the above, and an absolute angle A in the 0-th (N=0) portion is found. As a result, the absolute angle A (°) is given by an expression 180×0−90+B=B−90.

When the value of the first detection signal Va is lower than VL, a rotation angle range B is similarly found on the basis of the value of the first detection signal Va. However, the absolute angle A is found corresponding to the next first (N=1) portion. That is, after a rotation angle range Θa corresponding to the flat portion and an arbitrary rotation angle Θ0 are set, the absolute angle A (°) is given by an expression 180×1−90+B=B+90.

When the value of the first detection signal Va is higher than or equal to VL and is lower than or equal to VH, the rotation angle range B is 0 on the basis of the first detection signal Va, and the absolute angle A is found corresponding to the next first (N=1) portion. The absolute angle A (°) is given by an expression 180×1−90+0=90.

In general, when the value of the second output signal Vb is included in a gradually rising portion that links the N-th flat portion and the N+1-th flat portion, the first detection signal Va is detected corresponding thereto. When the value Va is higher than VH, the absolute angle A (°) is given by an expression N×Θa−Θ0+B. When the value Va is lower than VL, the absolute angle A (°) is given by an expression (N+1)×Θa−Θ0+B. When the value Va is higher than or equal to VL and is lower than or equal to VH, the absolute angle A (°) is given by an expression (N+1)×Θa−Θ0.

Another method for measuring the absolute angle A will now be described.

When the value of the second detection signal Vb is included in a flat portion, the absolute angle of the rotation angle is found on the basis of the first detection signal Va and the second detection signal Vb, in a manner similar to the above. When the value of the second detection signal Vb is included in a gradually rising portion, the position in the gradually rising portion at which the second detection signal Vb exists is calculated, and the absolute angle A is found using the calculated value.

In the above embodiment, the first detection signal Va includes sawtooth continuous pulses each having a portion that gradually and linearly rises and a potion that sharply falls within the detection range, and the second detection signal Vb rises stepwise. Alternatively, the first detection signal Va may include sawtooth continuous pulses each having a portion that gradually and linearly falls and a portion that rises sharply, and the second detection signal Vb may fall stepwise.

While the GMR element is used as the magnetoresistive element in the above embodiment, it may be replaced with a MR element, a TMR element, or a magnetoelectric transducer element such as a Hall element.

While the first and second output mechanisms are non-contact magnetic output means in the above embodiment, the second output mechanism may be a contact output means such as a rotary variable resistor or a rotary encoder.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A rotation-angle detecting device comprising:

a rotor;

a first output mechanism for outputting a first detection signal in response to the rotation of said rotor; and a second output mechanism for outputting a second detection signal in response to the rotation of said rotor, wherein a first transmission gear, and a second transmission gear having intermittent teeth are arranged along the rotation axis on an outer peripheral surface of said rotor, said first output mechanism includes a first output gear that is meshed with said first transmission gear and that rotates on an axis in parallel with the axis of said rotor, and a first output section for outputting the first detection signal in response to the rotation of said first output gear, and said second output mechanism includes a second output gear that is meshed with said second transmission gear and that rotates on an axis in parallel with the axis of said rotor, and a second output section for outputting the second detection signal in response to the rotation of said second output gear, and wherein the rotation angle of said rotor is detected as an absolute angle on the basis of the first detection signal and the second detection signal.

2. A rotation-angle detecting device according to claim 1, wherein the first detection signal has a predetermined period and continues within the rotation range of said rotor, and the second detection signal rises or falls stepwise within the rotation range of said rotor.

3. A rotation-angle detecting device according to claim 1, wherein said second output gear includes upper and lower tooth segments arranged vertically and alternately, said upper tooth segment is meshed with said second transmission gear, and said lower tooth segment engages with the outer peripheral surface of said rotor after said upper tooth segment is rotated by a predetermined angle in engagement with said second transmission gear in order to prevent said second output gear from returning.

4. A rotation-angle detecting device according to claim 1, wherein each of said first output section and said second output section includes a permanent magnet with different magnetic poles opposing each other with the rotation axis therebetween, and a magnetoresistive element whose resistance varies depending on the direction of a magnetic field of said permanent magnet.

5. A rotation-angle detecting device according to claim 1, wherein said first output mechanism is a non-contact magnetic output means, and said second output mechanism is a contact output means.

6. A rotation-angle detecting device according to claim 5, wherein said second output mechanism is a rotary variable resistor.

* * * * *